(12) United States Patent
Van Wyk et al.

(10) Patent No.: US 8,717,943 B2
(45) Date of Patent: May 6, 2014

(54) PEER-TO-PEER COMMUNICATIONS IN AMI WITH SOURCE-TREE ROUTING

(75) Inventors: Hartman Van Wyk, Mont Louis sur Loire (FR); Daniel Popa, Paris (FR)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 13/275,800

(22) Filed: Oct. 18, 2011

(65) Prior Publication Data

US 2013/0094404 A1    Apr. 18, 2013

(51) Int. Cl.
*H04W 84/02* (2009.01)

(52) U.S. Cl.
USPC .......................................... 370/256; 370/254

(58) Field of Classification Search
USPC ................................................ 370/256, 254
See application file for complete search history.

(56) References Cited

U.S. PATENT DOCUMENTS

| 2009/0135851 | A1  | 5/2009 | Veillette |
| 2009/0154482 | A1  | 6/2009 | Ham et al. |
| 2010/0061272 | A1* | 3/2010 | Veillette ........................ 370/254 |
| 2011/0051662 | A1  | 3/2011 | Billhartz et al. |
| 2012/0246268 | A1* | 9/2012 | Richeson et al. ............. 709/217 |

FOREIGN PATENT DOCUMENTS

| GB | 2 381 427   | 4/2003  |
| JP | 11205331    | 7/1999  |
| JP | 2010510729  | 4/2010  |
| JP | 2010245783  | 10/2010 |

OTHER PUBLICATIONS

May 29, 2012 Office Action issued in Canadian Patent Application No. 2,755,331.
Information Disclosure Statement materials reported in U.S. Patent Publication No. 2010/0061272 (U.S. Appl. No. 12/554,135).
Office Action for Canadian Patent Application No. 2,755,331 issued Feb. 16, 2012.
PCT International Search Report for PCT International Application No. PCT/US2011/062796, search completed Feb. 6, 2012; report mailed Feb. 22, 2012.
Written Opinion of the International Searching Authority for PCT International Application No. PCT/US2011/062796, opinion completed Feb. 6, 2012; date of mailing Feb. 22, 2012.
Translated Japanese Office Action mailed Oct. 15, 2013 for Japanese patent application No. 2013-540113, a counterpart foreign application of U.S. Appl. No. 13/275,800, 8 pages.

* cited by examiner

*Primary Examiner* — Robert Wilson
*Assistant Examiner* — Pamit Kaur
(74) *Attorney, Agent, or Firm* — Lee & Hayes, PLLC

(57) ABSTRACT

Methodologies are provided for establishing peer-to-peer communications between nodes in a tree structured network having plural nodes including a root node. A source node seeking to send a message to a destination node will first request a most advantageous available path from the source to the destination node, and then the root node (or possibly another node within the network that has additional storage resources) will provide a routing path to one or both of the source and destination nodes. Messages may then be sent between the source and destination nodes that may or may not include addressing information in the packet headers without having to request routing information again for additional messages between the same nodes.

28 Claims, 2 Drawing Sheets

PEER-TO-PEER COMMUNICATIONS IN AMI WITH SOURCE-TREE ROUTING

FIELD OF THE SUBJECT MATTER

The presently disclosed subject matter relates to communications. More specifically, the presently disclosed subject matter relates to peer-to-peer routing in an advanced metering infrastructure (AMI).

BACKGROUND OF THE SUBJECT MATTER

Generally, an Advanced Metering Infrastructure (AMI) may contain up to millions of metering devices distributed over a large geographical area. Such devices are typically configured to exchange messages including data, for example, utility consumption data, with a cluster of servers including data metering collectors, and network management servers. AMI environments are generally organized around Autonomous Systems (AS) headed by cell relays (sometimes referred to as cell routers), where each AS is connected by way of a back-haul network to servers that may be located at a utility home-office or other central location.

Those of ordinary skill in the AMI art will appreciate that the logical infrastructure interconnecting the metering devices or endpoints and the cell relays/routers is frequently based on a tree topology, on top of, for example, a wireless mesh network or a wired network, such as using power lines.

Typically, the nodes forming the AS can be classified into two broad classes of devices or nodes, with respect to the resources available at each respective device/node. Such broad classes include full functionality nodes/devices and reduced functionality nodes/devices. Full functionality nodes are devices that typically have relatively large memory space and high processing power, while reduced functionality nodes correspond to devices that typically have relatively smaller memory space and lower processing power.

One of the main challenges for routing in an AMI network with reduced functionality nodes is the implementation of an efficient routing scheme. The resource constraints of such nodes make the storing and maintenance of large routing tables a practical impossibility. Eventually, such nodes often maintain a greatly reduced or "lite" routing table with routes toward a very few of their one-hop neighbors. Typically, such nodes only store information about their one-hop upstream neighbors, sometimes called their parents. In such context, it should be appreciated by those of ordinary skill in the art that storing in such nodes more detailed routing information to reach neighbors that may be several-hops away is very challenging.

In frequent cases, the only node within an established tree that has a global view on the network may be what is referred to as the root of the tree. The root has enough resources to accommodate detailed routing information and maintain route/routing information to each node within the tree. As those of ordinary skill in the art will appreciate, path computation towards each node can in straightforward fashion be implemented using known techniques once the root has detailed knowledge on topology and available links.

The routing schemes in such tree topologies are typically organized around two kinds of flows: upstream flows and downstream flows. Upstream packets flow from tree leaves up to the root of the tree (multipoint to point), while downstream packets flow from the tree root towards the leaves (point to multipoint). Upstream messages are always destined for the root of the tree, while downstream messages can be destined to any of the tree nodes.

Upstream routing is simple in that each node (even reduced functionality nodes that have at least one entry in their routing table for upstream neighbors that receives a message destined for the root simply forwards it upstream to its one-hop neighbor (parent). Downstream routing uses a source routing approach. That is, the root of the tree inserts the explicit route information, including all the addresses of the intermediate nodes/hops between the source and the destination of the message, into the header of a downstream packet. Here, each intermediate node that receives a packet inspects the routing header of the packet (which is a list with the complete path), processes and consumes/removes the header containing its address, and further forwards the packet to the next-hop on the list.

As is understood by those of ordinary skill in the AMI art, intermediate nodes do not need to store tables listing their downstream neighbors because wireless networks are a broadcasting domain so that a unicast message transmitted by a node is inherently heard by all of its neighbors. Such person of ordinary skill in the art will also appreciate that source routing is not an issue for such hardware-constrained nodes, and that end-to-end reliability can be achieved by deploying one-hop retransmission mechanisms, at link-layer, as well as end-to-end retransmission mechanisms at higher layers.

As may be seen, within an AMI environment communications between endpoints (that is, for example, metrology devices) and a tree root (or more generally a central facility that may be generally designed to collect data from the various endpoints) is a fairly straightforward process. More recently, however, there has been expressed increasing interest in providing communications capabilities between peer devices for providing such features as demand response and automation communications. It would be advantageous, therefore, to provide efficient peer-to-peer communication capabilities between the nodes of the tree, when the source and destination of such communications are presumptively not the root of the tree. Using only previously known routing mechanisms, the tree nodes cannot set-up peer-to-peer communications directly. That is, peer-to-peer communications between nodes that are not roots must per the current state of the art be routed nonetheless via the root of the tree. As such, it would be advantageous to provide improved routing capabilities that would provide peer-to-peer routing optimizations for advanced metering infrastructure applications in an open operational framework.

While various aspects and alternative embodiments may be known in the field of AMI routing, no one design has emerged that generally encompasses the above-referenced characteristics and other desirable features associated with peer-to-peer communication technology as herein presented.

SUMMARY OF THE SUBJECT MATTER

In view of the recognized features encountered in the prior art and addressed by the presently disclosed subject matter, improved methodology for providing source node initiated communications for networked devices including automated meter reading (AMR) devices communicating over advanced metering infrastructure (AMI) and other wide area network (WAN) environments is provided.

The presently disclosed subject matter relates, for example, to a method for establishing peer-to-peer communications in a tree structured network having a plurality of nodes, and in some embodiments including a root node. The method includes sending a message from a source node requesting information from the root node for path routing from such source node to a destination node. The most advantageous path between the source node and the destination node is determined by the root, and such determined path information is then sent to the source node. The source node then transmits a message to the destination node using the path information.

In some embodiments, the method further may include sending a message from the destination node to the root requesting reverse routing path routing to the source node and sending reverse routing path information to the destination node. In selected embodiments, the reverse path information may be automatically sent to the destination node by the root so that the destination node may respond to a message from the source node without first requesting path information. In other embodiments, present methodology may provide for configuring at least one of the source and destination nodes to cache the path information so that repeating the path request may be avoided.

In some embodiments making use of a root node, the root node may be configured to determine the most advantageous path and to send the path information to the source node. In other embodiments, at least one full functionality node—other than the root—may be provided among the plurality of nodes and configured to store routes within the tree. In such exemplary embodiments, the at least one full functionality node may determine the most advantageous path and send the path information to the source node.

In selected embodiments, the method may provide for configuring nodes in a communications path from a source node to a destination node to store the address of the next-hop from the packet header of a previous communication. In such exemplary embodiments, subsequent packets from the same source to the same destination may be sent without adding source routing information into the header of the packet.

In other exemplary embodiments of the presently disclosed subject matter, the method may provide for configuring nodes in the path between the source node and the destination node to forward message packet headers unchanged so that the destination node may learn the reverse root path to the source node. In selected alternative embodiments of the presently disclosed subject matter, the method may provide for configuring the destination node to process heard packets destined to itself for errors and to announce a new peer-to-peer route to the source node.

The presently disclosed subject matter also relates to methodology for establishing peer-to-peer communications in an advanced metering infrastructure. In accordance with such exemplary methods, a plurality of nodes (in some instances including a root node) are provided and configured as a tree structured network. In such exemplary methods, a first node of the plurality of nodes is configured to initiate peer-to-peer communications with a second of the plurality of nodes by requesting a route to the second of the plurality of nodes. The most advantageous path/route between the first node and the second node is determined and a message packet is transmitted from the first node to the second node. In selected of such exemplary methods, the message packet may include a header including the path information. In selected of such embodiments, the root node may be configured to determine the most advantageous path between the first node and the second node and to transmit the path information to the first node.

In selected alternative embodiments of such exemplary methods, at least one full functionality node is provided within the plurality of nodes. In such embodiments, at least one full functionality node is configured to respond to the first node's request for path routing. In yet further embodiments of the presently disclosed subject matter, at least one selected node of the plurality of nodes are provided as wireless nodes. In such exemplary embodiments, the wireless nodes may be configured to listen for messages not necessarily addressed to themselves, to evaluate received messages for errors, to inspect routing header, and to announce eventual path optimizations/changes to the source of the messages if a "shorter" path is available.

In other present exemplary implementations of the foregoing, determining what constitutes a most advantageous path between an exemplary source node and an exemplary destination node may include using predetermined routing metrics so that predefined routing objectives are achieved.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application.

Yet further, it is to be understood that the presently disclosed subject matter equally encompasses corresponding devices and apparatus for practicing the present exemplary methodologies, and/or for operating in accordance with such exemplary methodologies. Those of ordinary skill in the art will better appreciate the features and aspects of such embodiments, and others, upon review of the remainder of the specification.

BRIEF DESCRIPTION OF THE DRAWINGS

A full and enabling disclosure of the presently disclosed subject matter, including the best mode thereof, directed to one of ordinary skill in the art, is set forth in the specification, which makes reference to the appended figures, in which.

Figure 1:
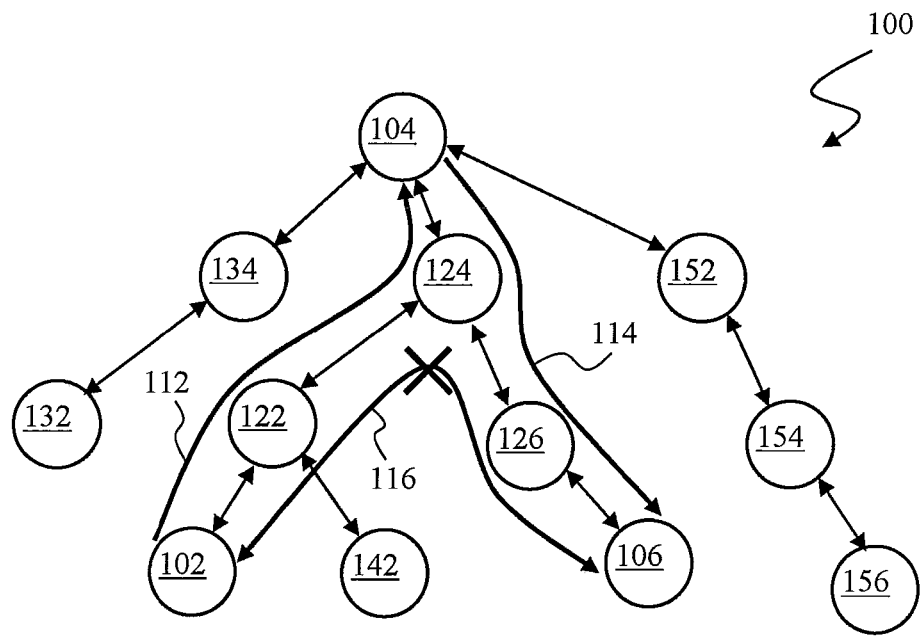
FIG. 1 diagrammatically illustrates the present inability to provide for peer-to-peer communications between peer nodes without forwarding the traffic via the root node.

Repeat use of reference characters throughout the present specification and appended drawings is intended to represent same or analogous features, elements, or steps of the presently disclosed subject matter.

DETAILED DESCRIPTION OF THE SUBJECT MATTER

As discussed in the Summary of the Subject Matter section, the presently disclosed subject matter is particularly concerned with methodology for providing a source node initiated peer-to-peer routing scheme in tree organized networks including such as in an advanced metering infrastructure (AMI).

With initial reference to FIG. 1, the basic concept for the presently disclosed subject matter recognizes that when an application layer of, for example, node 102 in, for example, an AMI system tree 100 has a message to send to an address other than the address of the root node 104, node 102 must ordinarily route a message to root node 104 requesting the explicit path towards destination node 106. When root node 104 receives such message, it responds back to node 102 with the presently most advantageous known path towards node 106, which, of course, includes a path via root node 104 (upstream path 112 then downstream path 114) as opposed to a more direct route such as route 116 which, in the prior configuration of FIG. 1, is not possible.

The main drawbacks associated with such approach include increased latency, increased probability of collisions, and unnecessary loading of some nodes and branches in the tree. Latency in delivering peer-to-peer messages is increasing since the path used to deliver the peer-to-peer messages is sub-optimal. This is due to the fact that a message does not take the "shortest" available path. Generally, the shortest path should preferably be interpreted as the optimal path between the source and the destination of the message, as a function of the objective of optimization functionality (i.e., high probability of successful transmission). In the instance illustrated in FIG. 1, a packet ordinarily travels upstream from node 102 via path 112 to root node 104 of the tree 100 and then downstream via path 114 to its final destination, exemplarily, node 106.

Peer-to-peer communication via the root node 104 of the tree 100 is subject to an increasing probability of collisions and thus increasingly subject to end-to-end delay. For example, consider that the probability of successful transmission of a packet between two adjacent nodes is p, and the probability of collision is $q=1-p$. For a communication where the source and the destination are 1-hop away, e.g., nodes 102 to 122 in FIG. 1, the probability of success is $p(1-q)^2$. For a communication where the source and destination are separated by N intermediate nodes, the probability of success is $p(1-q)^{(N+1)}$. It should be clear then that decreasing the number N of intermediate hops increases the probability of successful transmission and thus decreases the end-to-end delay.

Another drawback of the messaging system represented by FIG. 1 is that some branches and nodes of the tree 100 are unnecessarily loaded. For example, the link between root node 104 and node 124, and thus root node 104 itself, is unnecessarily loaded with additional upstream and downstream traffic. In addition spatial re-use, when available, of the network resources, i.e., frequencies, may be considerably reduced. For example, as illustrated in FIG. 1, communications between node 102 and 106 can unnecessarily monopolize the resources between root node 104 and node 124 and thus make root node 104 unavailable for receiving and/or sending messages from or to other neighbor nodes.

Figure 2:
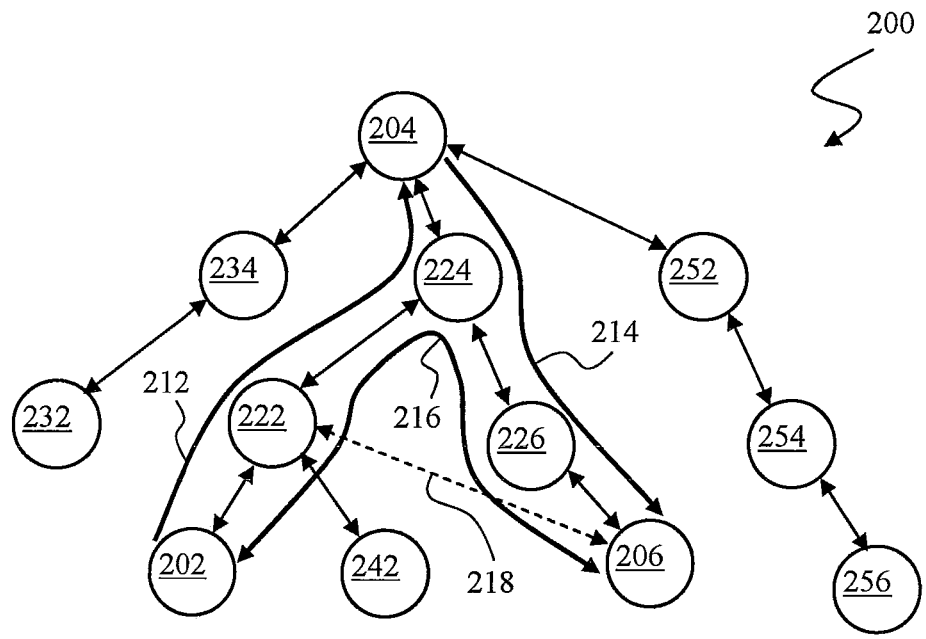
FIG. 2 diagrammatically illustrates a source node initiated peer-to-peer communication between peer nodes in accordance with an exemplary embodiment of the presently disclosed subject matter.

In accordance with presently disclosed technology, such drawbacks and others are addressed by providing alternative paths for peer-to-peer messages. With reference now to FIG. 2, in one representation of exemplary embodiment of presently disclosed technology, a source node, exemplarily node 202, sends an explicit path request message to root node 204 of the tree 200, by using an upstream message along path 212. Root node 204 has a complete view of the topology of tree 200 and maintains explicit path information towards all the nodes. In such manner, root node 204 can easily compute the most advantageous known path between, for example, nodes 202 and 206 and further can send the path information back to a requesting node, for example node 202.

In accordance with further aspects of the presently disclosed subject matter, a few full functionality nodes may be either uniformly or randomly dispatched among the nodes within each Autonomous Systems (AS) as represented by trees 100, 200 of FIGS. 1 and 2. Such nodes, for example nodes 234, 222, and 252, may be configured with enough resources to store detailed information on one-hop and/or several hops routes within each AS. In such instance, such nodes per the presently disclosed subject matter act as router nodes and announce their presence within the Autonomous Systems (AS). In such case, each node can request a peer-to-peer communication path from the nearest router (full functionality node) instead of from the root node.

Figure 3:
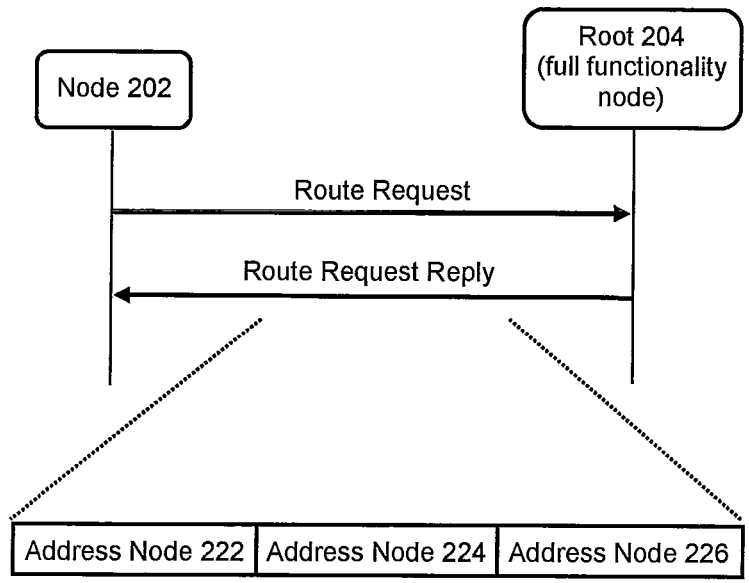
FIG. 3 is a block diagram illustrating an exemplary message sequence chart (MSC) of a peer-to-peer route request in accordance with a first embodiment of the presently disclosed subject matter.

A message sequence chart (MSC) of such exemplary present methodology is depicted in FIG. 3. As illustrated, node 202 may send a route request to root 204, or other full functionality node. Root 204, or other full functionality node, then computes the most advantageous known path between nodes 202 and 206 and responds with a route request reply giving the address sequence which corresponds in this instance to the address of node 222 followed by the address of node 224 followed by the address of node 226.

If node 206 must respond to messages received from node 202, node 206 per presently disclosed subject matter may send an identical route request message to root node 204, or other full functionality node, in order to obtain the reverse route to node 202. Furthermore, either or both of nodes 202 and 206 per presently disclosed subject matter may be configured to cache the path provided by root 204, or other full functionality node, to avoid repeating the path request for each packet to be send to its peer.

In a further embodiment or aspect of the presently disclosed subject matter, the first peer-to-peer packet may maintain its routing header structure unchanged up to its destination. That is, intermediate nodes do not remove their addresses from the packet header. By such technique, per presently disclosed subject matter, destination node 206 can readily determine the reverse route to node 202, assuming the intermediate paths/links are bidirectional in the sense that they have similar communication quality in both directions.

In yet another exemplary embodiment of the presently disclosed subject matter, under an assumption that a peer-to-peer communication between nodes is bidirectional, that is, in the sense that a message sent from node 202 to node 206 will generate a response from node 206 to node 202, root node 204, upon receiving a request for an explicit path between node 202 and node 206, may be configured, as it responds back to node 202 as previously described, to automatically send the reverse path to node 206. A message sequence chart (MSC) of such present exemplary methodology is depicted in FIG. 4.

Figure 4:
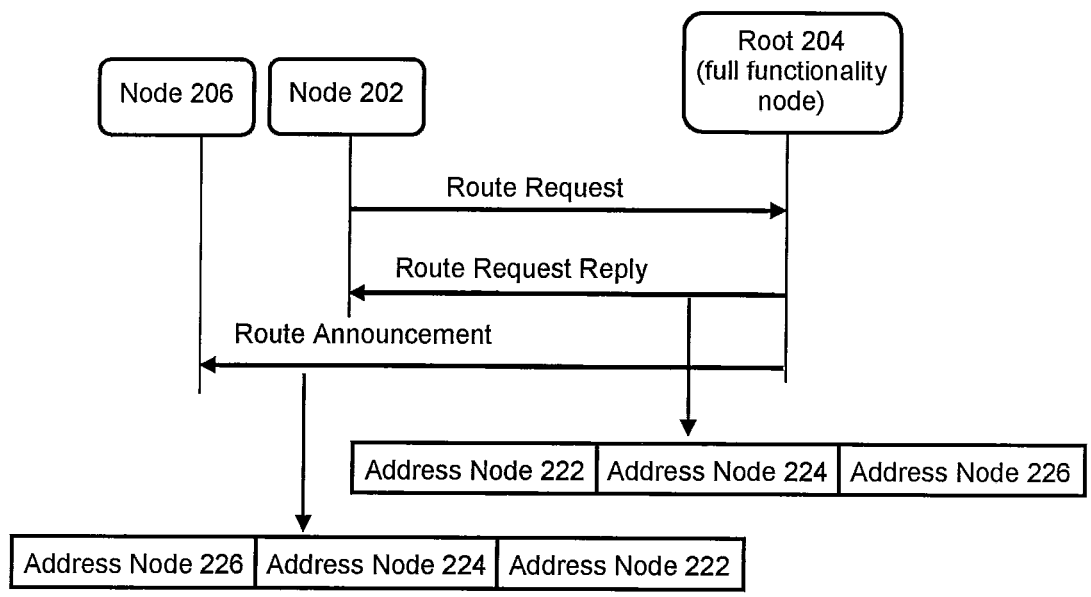
FIG. 4 is a block diagram illustrating an exemplary message sequence chart (MSC) of a route request in accordance with a further embodiment of the presently disclosed subject matter.

With reference to FIG. 4, when root node 204, or other full functionality node, receives a route request from node 202, the node generates two messages. A first of the messages corresponds to a Route Request Reply that is made to the source of the message, i.e. in this instance, node 202. The second of the messages corresponds to a Route Announcement and is made to the node located at the end of the peer-to-peer route, i.e., in this instance, destination node (node 206) for the subject peer-to-peer communication. As represented in present exemplary FIG. 4, the address sequences sent to node 202 and node 206 are mirror images of each other, representing the different directions between the two nodes towards each other.

In a still further exemplary embodiment of the presently disclosed subject matter, the peer-to-peer communication between nodes 202 and 206 may be enhanced by an auto-learning mechanism. In such exemplary embodiment, after node 202 sends a first peer-to-peer communication packet to node 206 each node along path 216 between nodes 202 and 206, such nodes (that is, nodes 222, 224, 226) learn from the packet header the address of the next-hop for reaching the destination node 206. As an example, for the destination 206, the intermediate node 222 will store as next-hop the address of node 224, node 224 will store as next-hop the address of node 226, and finally node 226 will store as next-hop the address of the node 206.

Node 202 may then send following packets to node 206 without adding explicit route information into the header of the packet. When node 222, which is listening to the medium, receives a packet destined to node 206, it will receive the packet, process it, and will simply forward it to the next-hop address 224. Then, node 224 will forward the packet to node 226, and so on until the packet reaches its final destination 206.

In a further additional present exemplary embodiment, if the destination node 206 "hears" a peer-to-peer packet destined to itself from node 202, and routed as previously described, it will process the packet completely. If no error is detected, that is, no bits are corrupted due, for example, to interference, node 206 acknowledges back to node 202 the proper reception of the packet. That is, the node 206 announces to node 202 that they can communicate directly and a shorter route may be set up for the peer-to-peer communication between nodes 202 and 206, all in accordance with the presently disclosed subject matter.

For example, in the instance that the nodes are a part of a wireless mesh network, each node broadcasts its messages such that many paths may be created among various nodes. As previously described, the most advantageous path from node 202 to node 206 had been along path 216 via nodes 222, 224, and 226. In the case, however, where destination node 206 may have "heard" a packet destined to itself being broadcast from node 222 via direct path 218 and where no errors in the transmission were detected, the path from node 202 to 206 may be changed to the shorter route, in accordance with an aspect of the presently disclosed subject matter.

In accordance with additional, optional aspects of the presently disclosed subject matter, in various exemplary implementations of the foregoing, determining what constitutes a most advantageous path between an exemplary source node and an exemplary destination node may include using predetermined routing metrics so that predefined routing objectives are achieved. Generally speaking, routing protocols for wireless networks focus on finding the most advantageous path, and in this instance eventually what would be the most advantageous alternative paths which helps to ensure the required quality of service for a given application. As understood by those of ordinary skill in the art without requiring detailed explanation, quality of service in such context may be expressed in terms of latency and reliability. For some implementations, routing metrics for wired networks make use of hop count and physical capacity to determine what constitutes a most advantageous path, which means the arrangements seek to achieve minimum hop count or maximum bandwidth. Wireless paths have significantly different characteristics compared to wired links, such as low capacity and high packet error rate, leading to relatively poorer throughput. Accordingly, a routing algorithm for a wireless network preferably selects most advantageous path in a given context by explicitly taking the quality of the wireless links into account.

It will be understood by those of ordinary skill in the art that for various implementations of the presently disclosed subject matter, different routing metrics can be used to estimate characteristics of a path between source and destination. For example, some routing metrics may be intended to capture the stability of a path, while others may focus on energy consumption, and still others may be more focused on the resulting bandwidth of a determined path. Further, other metrics may be used to estimate the quality of the wireless links, including those which take into account the packet error rate on the link, such as ETX. As well known to those of ordinary skill in the art, the ETX metric of a wireless link is the expected number of transmissions required to successfully transmit and acknowledge a packet on a link. Those of ordinary skill in the art, within the broader context of the presently disclosed subject matter, may implement path calculation algorithms (details of which form no specific aspect of the presently disclosed subject matter) which will use metrics in order to find the most advantageous path (or eventual alternative most advantageous paths) for a given context. Furthermore, it is to be understood that such metrics in some instances may be static, or they may dynamically change, such as a function of the estimated wireless link quality.

While the presently disclosed subject matter has been described in detail with respect to specific embodiments thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure is not intended to preclude inclusion of such modifications, variations, and/or additions to the presently disclosed subject matter as would be readily apparent to one of ordinary skill in the art.

What is claimed is:

1. A method implemented at least in part by a first node, the first node selected from among a plurality of nodes including a full functionality node configured within a tree structured network, for establishing peer-to-peer communications in a tree structured network having a plurality of nodes including a root node or a router node, comprising:

sending a first message to one of the root node or the router node, either one of which has functionality capable of storing routes within the tree structured network, the first message requesting path information to a destination node;

receiving the path information sent by the root node or the router node, the path information comprising at least one of a shortest path or a most direct path between the source node and the destination node;

transmitting a second message to the destination node using the path information; and receiving information from a node to which the second message was not addressed, the information announcing recommended path changes for the second message.

2. The method as in claim 1, further comprising:

sending a third message from the destination node to the root node or router node requesting reverse routing path information to the source node; and receiving the reverse routing path information at the destination node.

3. The method as in claim 1, further comprising:

receiving automatically sent reverse path information at the destination node, whereby the destination node responds to the second message from the source node without first requesting path information.

4. The method as in claim 1, further comprising:

caching the received path information to thereby avoid repeated requests for the path information.

5. The method as in claim 1, wherein the source node receives the path information from the root node.

6. The method as in claim 1, further comprising:

storing the path information within at least one router node of the tree structured network, wherein the at least one router node sends the path information to the source node.

7. The method as in claim 1, further comprising:

storing addresses of nodes in a communications path from the source node to the destination node based on a packet header of a previous communication, whereby subsequent packets sent from the source node to the destination node may be sent without adding route information into the packet header of the subsequent packets.

8. The method as in claim 1, further comprising:

forwarding message packet headers unchanged through nodes in a path between the source node and the destination node, whereby the destination node determines a reverse root path to the source node based on the unchanged packet headers.

9. The method as in claim 1, wherein selected of said plurality of nodes comprise data endpoints.

10. The method as in claim 9, wherein selected of said data endpoints are associated with metering devices in an advanced metering infrastructure.

11. The method as in claim 1, wherein said plurality of nodes comprises metering devices.

12. The method as in claim 11, wherein said metering devices are respectively associated with wireless communication devices.

13. The method as in claim 1, wherein the path information is based at least in part on predetermined routing metrics and predefined routing objectives.

14. The method as in claim 1, wherein the path information includes the shortest path.

15. The method as in claim 1, wherein the path information includes the most direct path.

16. The method as in claim 1, wherein the path information includes the shortest and the most direct path.

17. A method in a first node from among a plurality of nodes and from a full functionality node configured within a tree structured network for establishing peer-to-peer communications, comprising:

requesting a path routing from the first node to a second node from among the plurality of nodes;

receiving from the full functionality node, the path, comprising at least one of a shortest path and a most direct path between the first node and the second node;

transmitting a message packet to the second node using the received path; and receiving, from a node to which the transmitted message packet was not addressed, a peer-to-peer route to replace the received path.

18. The method of claim 17, wherein at least some nodes from among the plurality of nodes comprise data endpoints.

19. The method of claim 18, wherein at least some of the data endpoints are associated with metering devices in an advanced metering infrastructure.

20. The method of claim 17, wherein the plurality of nodes comprises metering devices.

21. The method of claim 19, wherein at least some of the metering devices are associated with wireless communication devices.

22. The method of claim 17, wherein the path is based at least in part on predetermined routing metrics and predefined routing objectives.

23. A method in a first node from among a plurality of reduced functionality nodes and from a full functionality node for establishing peer-to-peer communications in an advanced metering infrastructure, comprising:

requesting a path routing from the first node to a second node;

receiving from the full functionality node the path routing from the first node to the second node;

transmitting a message packet to the second node using the received path; and receiving, from a node to which the transmitted message packet was not addressed, an evaluation of a routing header of the transmitted message packet and a peer-to-peer route to replace the received path.

24. The method of claim 23, wherein at least some nodes from among the plurality of reduced functionality nodes comprise data endpoints.

25. The method of claim 24, wherein at least some of the data endpoints are associated with metering devices in an advanced metering infrastructure.

26. The method of claim 23, wherein the plurality of reduced functionality nodes comprises metering devices.

27. The method of claim 26, wherein at least some of the metering devices are associated with wireless communication devices.

28. The method of claim 23, wherein the path is based at least in part on predetermined routing metrics and predefined routing objectives.

* * * * *